US 12,493,659 B2

(12) United States Patent
Chan

(10) Patent No.: US 12,493,659 B2
(45) Date of Patent: Dec. 9, 2025

(54) METHOD AND SYSTEM FOR VERIFYING THE AUTHENTICITY OF CONTENT ASSOCIATED WITH AN ENTITY

(71) Applicant: Lois Chan, Wanchai (HK)

(72) Inventor: Lois Chan, Wanchai (HK)

( * ) Notice: Subject to any disclaimer, the term of this patent is extended or adjusted under 35 U.S.C. 154(b) by 627 days.

(21) Appl. No.: 17/474,709

(22) Filed: Sep. 14, 2021

(65) Prior Publication Data

US 2022/0083608 A1    Mar. 17, 2022

(30) Foreign Application Priority Data

Sep. 15, 2020   (HK) ............................ 32020016210.7

(51) Int. Cl.
*G06F 16/951* (2019.01)
*G06F 16/955* (2019.01)
*G06F 21/64* (2013.01)

(52) U.S. Cl.
CPC .......... *G06F 16/951* (2019.01); *G06F 16/955* (2019.01); *G06F 21/645* (2013.01)

(58) Field of Classification Search
CPC ...... G06F 16/951; G06F 16/955; G06F 21/16; G06F 21/645; G06F 16/9536;
(Continued)

(56) References Cited

U.S. PATENT DOCUMENTS 8,429,750 B2 * 4/2013 Bennett ............... H04L 63/1441
707/726
8,639,930 B2 * 1/2014 Stibel ..................... H04L 63/08
713/168

(Continued)

FOREIGN PATENT DOCUMENTS

| CN | 108701309 A | 10/2018 |
|---|---|---|
| CN | 109467592 A | 3/2019 |

(Continued)

OTHER PUBLICATIONS

Wang, Jicheng, University Information Technology Strategy and Practice in the Era of Big Data, Northeastern University Press, May 31, 2016, pp. 1-6.

(Continued)

*Primary Examiner* — Sharon S Lynch
(74) *Attorney, Agent, or Firm* — Hinckley Allen & Snyder; Stephen Holmes

(57) ABSTRACT

A system and method for verifying the authenticity of information associated with an entity and communicating the verification status of the information across a network. The system facilitates the receipt of data relating to information associated with an entity so that a corresponding data record can be created and stored in memory. A visually perceptible element, which corresponds to the verification status of the data record, is associated with the data record so that the visually perceptible element can be displayed to a requesting computing device to communicate the verification status of the data record. If the verification status of the data record is changed, the visually perceptible element associated with the data record is changed to reflect the new verification status which is automatically changed for any requesting computing devices so that the new verification status is communicated to the public from any platform displaying the visually perceptible element.

16 Claims, 5 Drawing Sheets

| User ID | Record ID | Content | Content URL | Image URL | Verified | Rejected | Verification Status |
|---|---|---|---|---|---|---|---|
| @User1 | Record1 | Born in 1976 | http://www.example1.com | http://www.serversystemweb site.com/images/image1.jpg | ✓ | | Verified |
| @User1 | Record2 | Born on 20 August | http://www.example2.com | http://www.serversystemweb site.com/images/image2.jpg | | | Pending |
| @User1 | Record3 | Born in 1975 | http://www.example3.com | http://www.serversystemweb site.com/images/image3.jpg | | ✗ | Rejected |

Profile Details | Social Media Accounts | Verification Dashboard

(58) Field of Classification Search
CPC .. G06F 16/9566; G06Q 10/10; G06Q 30/018; G06Q 50/01
See application file for complete search history.

(56) References Cited

U.S. PATENT DOCUMENTS

| | | | | |
|---|---|---|---|---|
| 8,646,037 | B2* | 2/2014 | Farsedakis | G06Q 50/10 726/4 |
| 8,732,803 | B2* | 5/2014 | Stibel | G06Q 10/107 713/168 |
| 8,856,956 | B2* | 10/2014 | Stibel | H04L 9/3215 726/28 |
| 9,002,944 | B2* | 4/2015 | Lewis | G07C 9/22 709/204 |
| 9,483,159 | B2* | 11/2016 | Myslinski | G06Q 30/02 |
| 9,852,276 | B2* | 12/2017 | McEvoy | H04L 63/08 |
| 9,892,109 | B2* | 2/2018 | Myslinski | G06Q 50/01 |
| 10,073,958 | B2* | 9/2018 | Spence | G06F 21/31 |
| 10,148,786 | B1* | 12/2018 | Beaty | H04L 63/0823 |
| 10,223,424 | B2* | 3/2019 | Bahl | G06F 16/285 |
| 10,348,726 | B2* | 7/2019 | Caluwaert | G06F 21/602 |
| 10,701,069 | B2* | 6/2020 | Caluwaert | G06F 21/32 |
| 10,726,426 | B2* | 7/2020 | Kelts | G06Q 30/018 |
| 10,747,837 | B2* | 8/2020 | Goldenstein | G06F 16/248 |
| 10,949,725 | B1* | 3/2021 | Alvarez-Cohen | G06F 16/9558 |
| 11,398,917 | B2* | 7/2022 | Cahill | G06F 16/90335 |
| 11,498,000 | B2* | 11/2022 | Yang | A63F 13/847 |
| 11,526,675 | B2* | 12/2022 | Ghulati | G06F 40/279 |
| 11,611,553 | B2* | 3/2023 | Caluwaert | G06F 21/602 |
| 11,816,680 | B2* | 11/2023 | Kelts | H04L 63/126 |
| 2009/0216760 | A1* | 8/2009 | Bennett | H04L 63/1441 707/999.005 |
| 2012/0151569 | A1* | 6/2012 | Farsedakis | G06F 21/31 726/8 |
| 2013/0013553 | A1* | 1/2013 | Stibel | H04L 63/08 707/E17.022 |
| 2013/0013927 | A1* | 1/2013 | Stibel | G06Q 50/01 713/172 |
| 2013/0097678 | A1* | 4/2013 | Farsedakis | G06F 21/31 726/5 |
| 2014/0047505 | A1* | 2/2014 | Stibel | H04L 9/3215 726/2 |
| 2014/0164994 | A1* | 6/2014 | Myslinski | G06F 3/04817 715/808 |
| 2014/0333412 | A1* | 11/2014 | Lewis | G07C 9/22 340/5.2 |
| 2014/0353369 | A1* | 12/2014 | Malin | G06K 19/06037 707/769 |
| 2015/0293897 | A1* | 10/2015 | Myslinski | G06F 3/0488 707/755 |
| 2016/0004852 | A1* | 1/2016 | McEvoy | G06F 21/31 726/7 |
| 2017/0065893 | A1* | 3/2017 | Kunieda | H04L 67/131 |
| 2017/0220761 | A1* | 8/2017 | Toupin | G16H 20/10 |
| 2017/0270285 | A1* | 9/2017 | Spence | G06F 21/32 |
| 2017/0277755 | A1* | 9/2017 | Bahl | G06Q 30/0201 |
| 2018/0060874 | A1* | 3/2018 | Kelts | G06F 21/36 |
| 2018/0374097 | A1* | 12/2018 | Hanna | H04L 63/123 |
| 2019/0057397 | A1* | 2/2019 | Malin | G06Q 30/018 |
| 2019/0124080 | A1* | 4/2019 | Caluwaert | G06F 16/9566 |
| 2019/0156348 | A1* | 5/2019 | Levy | G06Q 20/10 |
| 2019/0179861 | A1* | 6/2019 | Goldenstein | G06F 16/9535 |
| 2019/0281050 | A1* | 9/2019 | Caluwaert | G06F 21/32 |
| 2020/0052906 | A1* | 2/2020 | Cahill | H04L 9/3231 |
| 2020/0296097 | A1* | 9/2020 | Caluwaert | H04L 63/0861 |
| 2021/0016174 | A1* | 1/2021 | Yang | A63F 13/69 |

FOREIGN PATENT DOCUMENTS

| | | |
|---|---|---|
| WO | 2017079795 A1 | 5/2017 |
| WO | 2019032089 A1 | 2/2019 |

OTHER PUBLICATIONS

Office Action, China Appl. No. 202111081294.1, Oct. 10, 2024.

* cited by examiner

| Profile Details | Social Media Accounts | Verification Dashboard | | | | 51 |
|---|---|---|---|---|---|---|

| User ID | Record ID | Content | Content URL | Image URL | Verified | Rejected | Verification Status |
|---|---|---|---|---|---|---|---|
| @User1 | Record1 | Born in 1976 | http://www.example1.com | http://www.serversystemweb site.com/images/image1.jpg | ✓ | | Verified |
| @User1 | Record2 | Born on 20 August | http://www.example2.com | http://www.serversystemweb site.com/images/image2.jpg | | | Pending |
| @User1 | Record3 | Born in 1975 | http://www.example3.com | http://www.serversystemweb site.com/images/image3.jpg | | ✗ | Rejected |

METHOD AND SYSTEM FOR VERIFYING THE AUTHENTICITY OF CONTENT ASSOCIATED WITH AN ENTITY

TECHNICAL FIELD

The present invention relates to a method and system for verifying the authenticity of content associated with an entity.

BACKGROUND OF THE INVENTION

The Internet allows anyone to publish content online freely and easily. The Internet has given rise to many different social media platforms such as Twitter, Instagram, and Facebook, which allow individuals and companies to publish content and make it accessible to, and viewable by, a large online audience.

Whilst allowing anyone to freely publish material has many benefits, there are also many drawbacks. One such drawback is the ease with which it is possible to publish untrue content, often dubbed 'fake news', and to communicate a false message to the public.

Before the Internet and social media platforms existed, publicly consumed content was typically controlled by governments and large independent media corporations that were held accountable and, thus, had less opportunity to publish false content. Since the content was largely created by reputable journalists, it was generally trustworthy. However, since anyone can now freely publish, even anonymously, without being held accountable, many individuals and organizations use the Internet to publish false content in an attempt to influence public opinion according to their agendas.

With ever more sophisticated technologies, fake content is becoming more sophisticated and misleading. Video editing and AI technology have advanced so much so that synthetic or 'deepfake' videos can now be created featuring almost perfect representations of well-known individuals delivering a fake message in the voice of the individual. The ability to produce and publish such near-perfect content is extremely dangerous because if a controversial or antagonistic message is published and is believed to be genuine and to have originated from a high-powered individual or organisation, it could have very serious consequences and even lead to a conflict or a political or economic crisis.

Given the above, there is a need to provide safeguards against the creation of such content and means to allow the public to easily and quickly determine if published content is fake or genuine.

Social media platforms such as Twitter and Instagram have attempted to address the issue of fake news by allowing certain high-profile entities to verify ownership of their registered social media accounts. Upon verification, a visual indicator such as a blue tick is displayed adjacent to the user's name or 'handle' so that the users of the platform can determine that the account of a high profile or well-known entity such as a celebrity or large corporation is genuine. Thus, users can trust that content published under the account of a verified user is genuine. However, a problem with this approach is that it is platform-specific and does not allow the public to determine whether content published outside of the platform and associated with a particular entity is genuine or not.

It is an object of the present invention to overcome the above problems.

SUMMARY OF THE INVENTION

According to a first aspect of the present invention, there is provided a computer-implemented method of verifying the authenticity of content associated with an entity and communicating the verification status of the content across a network comprising:
  using a computer processor to perform a plurality of steps, wherein the steps perform:
  receiving data representing, or relating to, content associated with an entity;
  creating a data record for the received data and storing details of the data record in memory;
  associating a visually perceptible element with the stored data record, wherein the visually perceptible element is stored in memory as a file with a unique filename and the visually perceptible element, when displayed on the display of a computing device, corresponds to a first verification status of the data record;
  publishing received data on a content verification page managed by or on behalf of the entity, together with the visually perceptible element in association with the published received data;
  requesting the entity to which the received data relates to verify or reject the authenticity of the received data;
  receiving a verification status signal from a computing device indicating whether the received data is verified or rejected, wherein the verification status signal is generated and transmitted following the entry of credentials known only to the entity or a representative of the entity;
  upon receipt of the verification status signal sent by, or on behalf of, the entity, updating the data record with the indicated verification status;
  upon updating the data record with the indicated verification status, associating the data record with a digital image of a different visually perceptible element, wherein the different visually perceptible element corresponds to the indicated verification status; and
  upon request, generating a response related to the data record for the display of data related to the data record on a third-party page, the generated response including data for the display on the third-party page of an active link and/or the verification status of the data record and/or the visually perceptible element associated with the data record, wherein the active link is to the content verification page or software application content page controlled by the entity associated with the data record, the content verification page displaying content of the data record and the visually perceptible element corresponding to the verification status of the data record.

Advantageously, an entity can authenticate any online information published about the entity and communicate to the public what information the entity accepts as genuine and what information the entity rejects as fake, regardless of the platform or website on which the content is published.

The step of associating the data record with a digital image of a different visually perceptible element may comprise the step of overwriting the file of the visually perceptible element with a digital image of the different visually perceptible element or associating the data record with a different file storing a digital image of the different visually perceptible element.

The method may further comprise the step of locating, on a third party page, an active link to a verification page controlled by the entity and, upon detection of the active link, storing details of the third party page in the data record associated with the active link, wherein the stored details include the URL of the third party page on which the active link is located so that the entity can visit the URL and review content displayed at the URL for verification purposes. The active link may include details that are unique to a stored data record so that, upon locating an active link, the stored data record associated with the active link can be identified.

Each visually perceptible element may be different from each other visually perceptible element and may comprise one or more letters and/or one or more words and/or one or more images each representing a verification status of the data record. Each visually perceptible element may be displayed in a particular colour or combination of colours to indicate the verification status, wherein each visually perceptible element comprises a different colour or combination of colours from each other visually perceptible element. A first colour or combination of colours may indicate the data has been verified as authentic and a second colour or combination of colours indicates the data has been rejected. A third colour or combination of colours may indicate the data is pending verification.

The method may further comprise the step of filtering received data according to predetermined criteria, said predetermined criteria including one or more of: the IP address from which the data is received, the submission history of a registered user of the system from which the data is received, the URL on which the data received is located, and a reputation score assigned to a registered user of the system from which the submitted data is received.

The method may further comprise the step of analysing the content of the received data and cross-checking the content against one or more other trusted data sources and/or previously processed data records to assess the authenticity of the data, and automatically suggesting a verification status for the received data based on the assessment.

The method may further comprise the step of verifying the identity of the entity to which the received data is associated based on confirmation from the entity or a representative of the entity of access to a registered account of the entity with a third party service that has already verified the identity of the entity.

According to a second aspect of the present invention, there is provided a computer-implemented method of verifying the authenticity of information associated with an entity comprising:
  receiving, from a computing device, data representing information alleged to have originated from an entity;
  requesting, by a computing device, the entity to verify the authenticity of the information;
  receiving a verification signal from a computing device indicating whether the information is authentic, wherein the verification signal is generated and transmitted following the entry of credentials known only to the entity or a representative of the entity; and
  upon verification by, or on behalf of, the entity, storing data with instructions to display on a requesting computing device one or more visually perceptible elements indicating whether the data has been verified as authentic by, or on behalf of, the entity.

According to a third aspect of the present invention there is provided a computer-implemented method of verifying the authenticity of information associated with an entity and communicating the verification status of the information across a network comprising:
  receiving data representing or relating to information alleged to have originated from an entity;
  creating a data record for the received data and storing details of the data record in memory and assigning the data record an initial verification status, the initial verification status associated with a visually perceptible element stored in memory;
  requesting the entity to verify or reject the authenticity of the information of the data record;
  receiving a verification status signal from a computing device indicating whether the information is verified or rejected, wherein the verification status signal is generated and transmitted following the entry of credentials known only to the entity or a representative of the entity;
  upon receipt of the verification status signal sent by, or on behalf of, the entity, updating the verification status of the data record with the indicated verification status; and
  transmitting data of the data record to a requesting computing device, wherein said data includes the verification status of the data record and a visually perceptible element associated with the data record, the visually perceptible element representing the verification status of the data record for display on the requesting computing device to visually communicate the verification status of the data record.

The method may further comprise the step of, upon updating the verification status of the data record, changing the visually perceptible element associated with the data record to a different visually perceptible element wherein the different visually perceptible element corresponds to the indicated verification status.

According to a fourth aspect of the present invention there is provided a system for verifying the authenticity of information associated with an entity and communicating the verification status of the information across a network comprising:
  a data receiving module for receiving data representing or relating to content alleged to have originated from an entity;
  a data processing module for creating a data record for the received data and storing details of the data record in memory;
  the data processing module configured to associate a visually perceptible element with the stored data record, wherein the visually perceptible element is stored in memory as a file with a unique filename and the visually perceptible element, when displayed on the display of a computing device, corresponds to a first verification status of the data record;
  the data processing module further configured to publish received data on a content verification page managed by or on behalf of the entity, together with the visually perceptible element in association with the published received data;
  the data processing module further configured to request the entity to which the received data relates to verify or reject the authenticity of the received data;
  the data processing module further configured to receive a verification status signal from a computing device indicating whether the received data is verified or rejected, wherein the verification status signal is generated and transmitted following the entry of credentials known only to the entity or a representative of the entity;

the data processing module further configured, upon receipt of the verification status signal sent by, or on behalf of, the entity, to update the data record with the indicated verification status;

the data processing module further configured, upon updating the data record with the indicated verification status, to associate the data record with a digital image of a different visually perceptible element, wherein the different visually perceptible element corresponds to the indicated verification status; and a data generation module configured, upon request, to generate a response related to the data record for the display of data related to the data record on a third-party page, the generated response including data for the display on the third-party page of an active link and/or the verification status of the data record and/or the visually perceptible element associated with the data record, wherein the active link is to the content verification page or software application page controlled by the entity associated with the data record, the content verification page displaying content of the data record and the visually perceptible element corresponding to the verification status of the data record.

The data processing module may be configured to associate the data record with a digital image of a different visually perceptible element by overwriting the file of the visually perceptible element with a digital image of the different visually perceptible element or associating the data record with a different file storing a digital image of the different visually perceptible element.

The system may further comprise a content tracking module configured to locate, on a third party page, an active link to a verification page controlled by the entity and, upon detection of the active link, pass details of the active link to the data processing module to store details of the third party page in the data record associated with the active link, wherein the stored details include the URL of the third party page on which the active link is located so that the entity can visit the URL and review content displayed at the URL for verification purposes. The active link may include details that are unique to a stored data record so that, upon locating an active link, the stored data record associated with the active link can be identified.

The system may further comprise a content management module configured to filter received data according to pre-determined criteria, said predetermined criteria including one or more of: the IP address from which the data is received, the submission history of a user of the system from which the data is received, the URL on which the data received is located, and a reputation score assigned to a user of the system from which the submitted data is received.

The content management module may be further configured to analyse the content of the received data and cross-check the content against one or more other trusted data sources and/or previously processed data records to assess the authenticity of the data, and automatically suggesting a verification status for the received data based on the assessment.

The system may be configured to verify the identity of the entity to which the received data is associated based on confirmation from the entity or a representative of the entity of access to a registered account of the entity with a third party service that has already verified the identity of the entity

DESCRIPTION OF THE DRAWINGS

So that the invention may be more clearly understood, one embodiment thereof will now be described, by way of example, with reference to the accompanying drawings in which:

FIG. 3 shows an example backend profile page including information about an entity and a list of items of information pending processing or having been processed by the entity;

DETAILED DESCRIPTION

Figure 1:
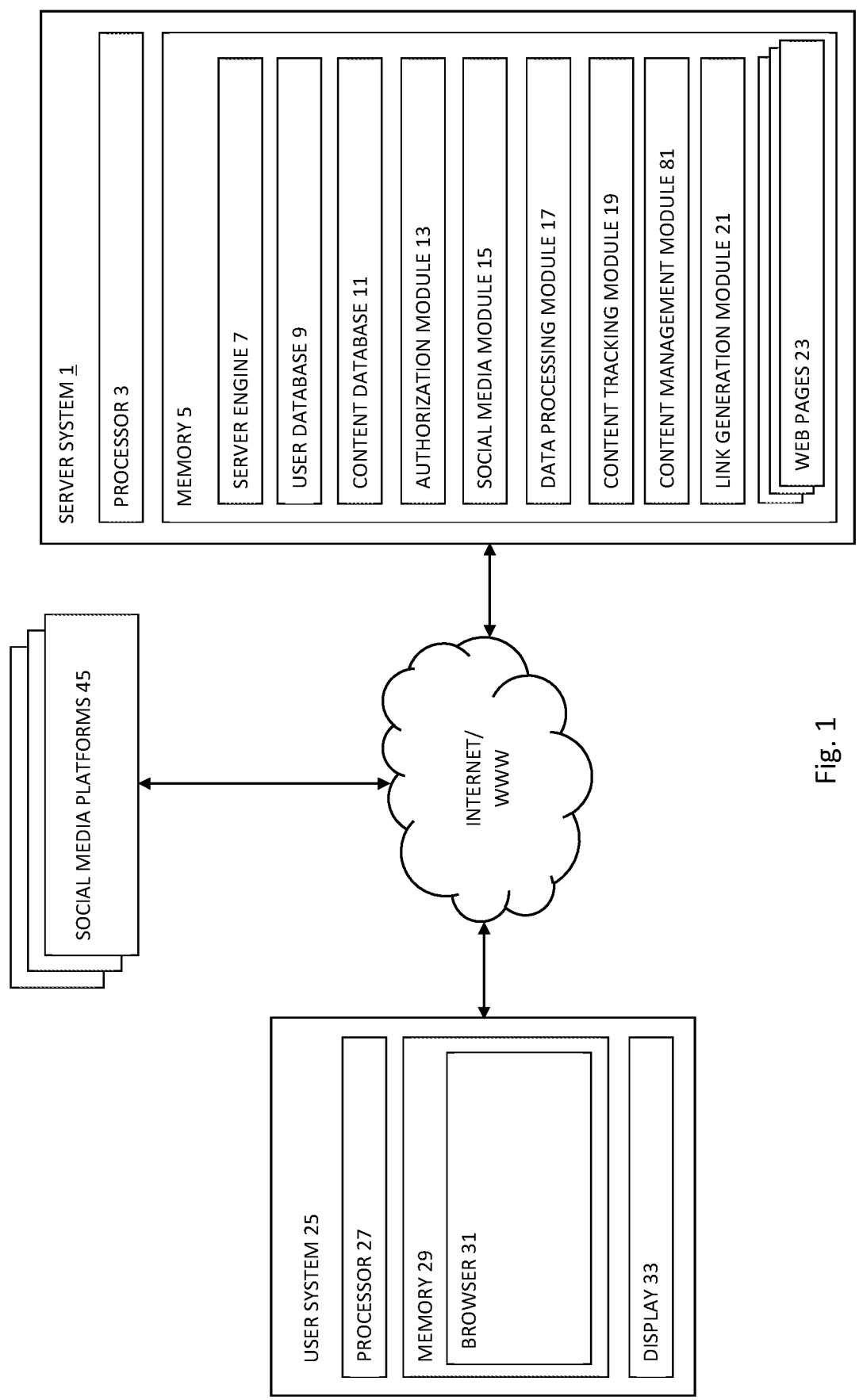
FIG. 1 shows a system according to an embodiment of the present invention.

With reference to FIG. 1, a server system 1 is configured to facilitate the management and verification of data representing or relating to information alleged to have originated from a particular entity. For example, the data may be written information about an individual or company or a video relating to the individual or company. It will be appreciated that the content may include one or more of audio, video, text, and graphics.

The server system 1 forms at least a portion of a network-accessible computing platform implemented as a computing infrastructure of processors, storage, software, data access, and other components that is maintained and accessible via a network such as the Internet. The server system 1 comprises at least one computing device having a processor 3 and memory 5 for storing instructions as modules executable by the processor 3. The server system 1 includes a server engine 7, a user database 9, a content database 11, authorization module 13, social media module 15, data processing module 17, content tracking module 19, content management module 81, data generation module 21, and various Web pages 23 stored in memory 5.

The server engine 7 receives HTTP requests to access Web pages 23 via a browser identified by URLs and provides various requested Web pages 23 to one or more requesting user systems 25. Whilst the present embodiment is implemented as a website or web application, it is equally possible that the invention may be implemented as a downloadable software application that may be installed on a user system 25 such as a smartphone or personal computer and via which data may be submitted to, and retrieved from, the server system 1. Accordingly, a Web page may instead be a user interface of a software application and so the term Web page may be considered to encompass any 'page' accessible via the Internet from a computing device and which may display published content.

A user system 25 comprises at least one computing device having a processor 27, memory 29, browser 31, display 33, and an interface to enable a user to interact with the user system 25 and transmit data to, and receive data from, the server system 1. A user system 25 may include a personal computer, tablet, mobile communication device or any other computing device capable of communicating with the server system 1 across a network.

The user database 9 of the server system 1 is configured to store details of registered users, including contact information, entity photograph/logo, entity specific information such as name, address, biographical information and birth date (if applicable), and access credentials such as username and password. The user database 9 may also store associations between user accounts, for example where one user is authorized as an administrator or editor of another user account. This may be useful for busy registered users that may wish to delegate account management duties to one or more sub-users or for large corporate entities that may have a number of employees authorized to act on behalf of the entity and administer the account of the registered user.

Registration with the server system 1 is facilitated by the authorization module 13 which is configured to process user data submitted via a user registration Web page of the server system 1 and to save the information to the user database 9. A user registration Web page includes input fields to enable user specific data to be entered and transmitted to the server system 1 for processing by the authorization module 13. Following user registration, the authorization module 13 permits a user to access their registered account upon entry of the access credentials associated with that account such as username and password and/or a cryptographic key. For additional security, the user may be required by the authorization module 13 to enter a further item of information as part of a multi-factor authentication process such as a one-time password transmitted to a user's registered telephone number or email address.

The authorization module 13 is further configured to facilitate verification of the identity of a registered user. Since the information of an entity could potentially be used by a non-authorized entity to register an account in that entity name and thereby impersonate that entity, a further verification step may be required to authenticate a particular user's identity. For example, a registered user may be required to submit a copy of an identity document to confirm the registered user profile matches the owner of the user account and/or to verify identity by linking to another social media account owned by the registered user that has already been verified. Upon verification, the authorization module 13 is configured to update the entry in the user database 9 for that particular entity to reflect that the verification step has been completed. If marked as complete, a visual indicator is associated with that registered user and displayed on the registered user's public profile page 35 to communicate to other users that the registered account is owned and controlled by the entity in question.

Figure 2:
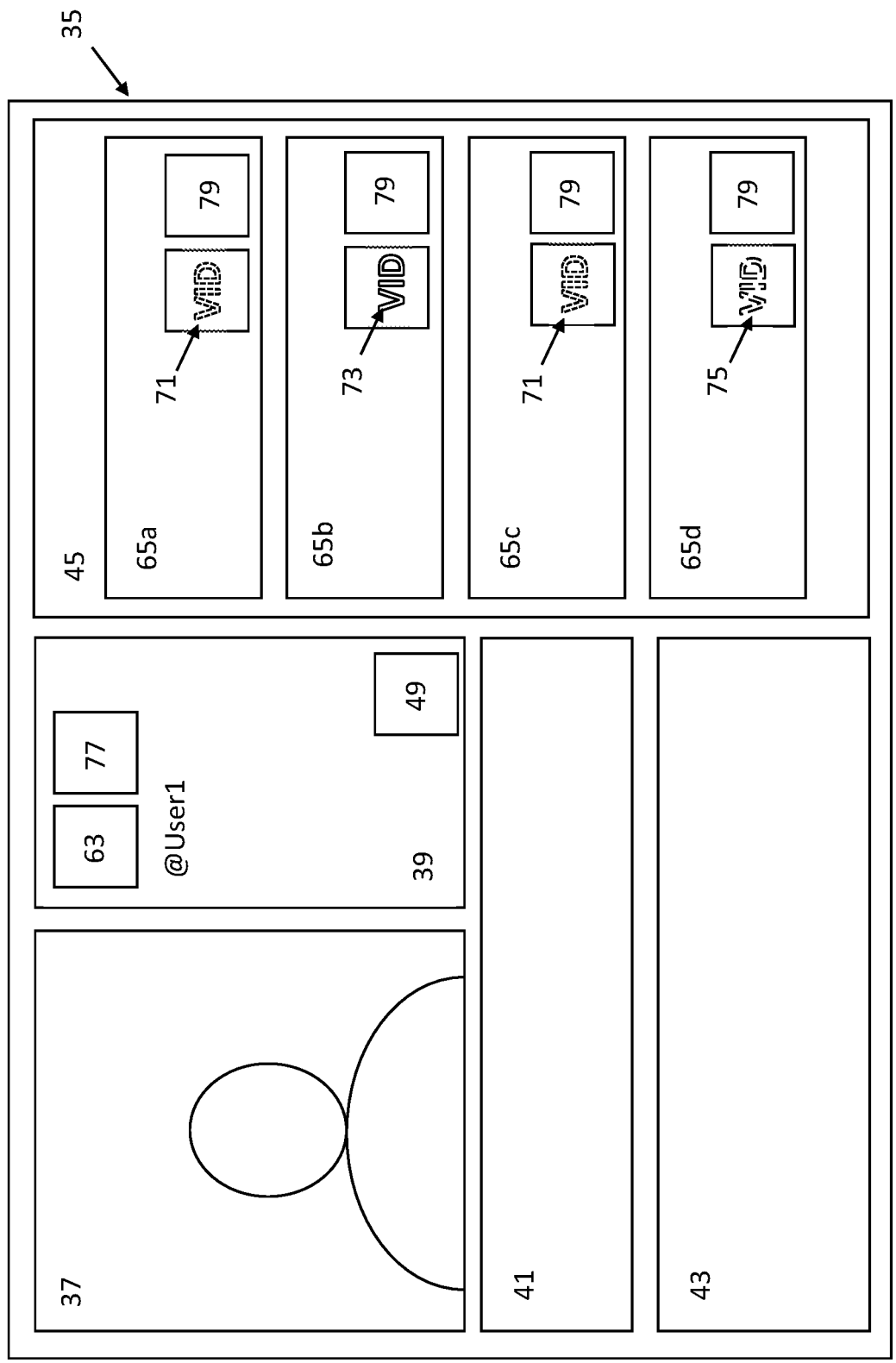
FIG. 2 shows an outline view of an example profile page of a user of the system of FIG. 1.

A public user profile Web page 35 is created upon registration. With reference to FIG. 2 the public profile Web page 35 is split into separate sections that each display registered user specific data. A first section 37 displays a copy of the registered user submitted photograph or logo, a second section 39 adjacent to the first section 37 displays the name, unique handle assigned to the registered user by the authorization module 13 or selected by the registered user if available, and contact information such as email address and telephone number (if chosen to be made public). A third section 41 displays registered user entered bibliographic information, and a fourth section 43 displays a list of any corresponding, linked social media accounts that have been verified as owned by the registered user and marked by the registered user for publication in the third section 41. A fifth section 45 contains the registered user's public 'feed' which contains snippets of data published on linked social media platforms 47 and/or snippets of data submitted directly to the server system 1 for verification by the registered user. Each public user profile Web page 35 also includes a 'follow' button 49 to allow registered users to be followed by other registered users for the sharing and tracking of posts.

With reference to FIG. 3, a back-end account dashboard 51 is also created upon registration which comprises a plurality of tabs to various pages with different account controls for registered user account management such as editing of the registered user profile, granting or removing of administrative access rights to or from other registered users, reviewing content submitted for verification, and linking the registered user account to other social media platforms of the registered user.

Linking of the registered user account to other social media platforms 45 is facilitated by the social media module 15 which is operable from the registered user dashboard 51 and permits a registered user to associate their verified account with other registered social media accounts. In the present embodiment, the social media module 15 allows a registered user to link their account to Twitter, LinkedIn, Facebook, Instagram, and YouTube through a social media login page. For example, if a registered user wishes to associate their account with their Twitter account, they may activate the connection link on their dashboard and enter their login information for their Twitter account. Upon successful login, a connection is made between the registered user account and the Twitter account so that any posts on Twitter may be retrieved by the server system 1 for optional display on the registered user public profile page 35. It will, of course, be apparent that the system may be adapted to allow linking to other social media accounts as desired.

For each verified social media account, the registered user has the option to publish their handle in the social media section 43 of their public profile Web page 35 and also to toggle between an active state in which social media posts from another verified social media account are published on their public profile Web page 35 or an inactive state in which no social media posts are displayed. Advantageously, therefore, the server system 1 allows registered users to clearly indicate to visitors of their public profile Web page 35 their ownership of their account by displaying their handles of other verified social media accounts. A further advantage is that registered users may consolidate two or more of their social media feeds into a single feed that is displayed on their public profile page 35 so that content from multiple different social media platforms can conveniently be consumed from a single platform.

Figure 4:
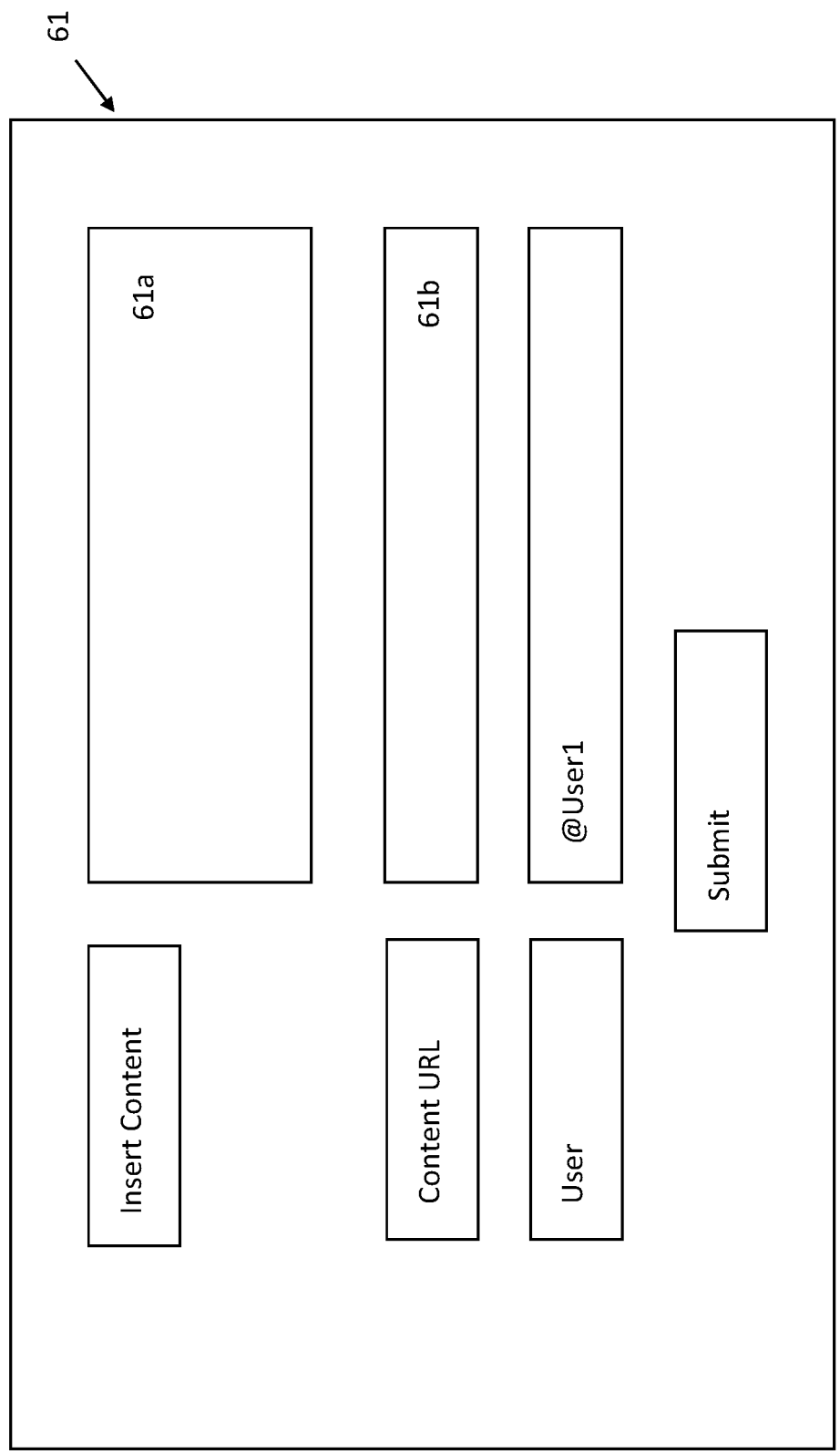
FIG. 4 shows an example content submission Web page for the submission of data to the system of FIG. 1 for verification.
Figure 5:
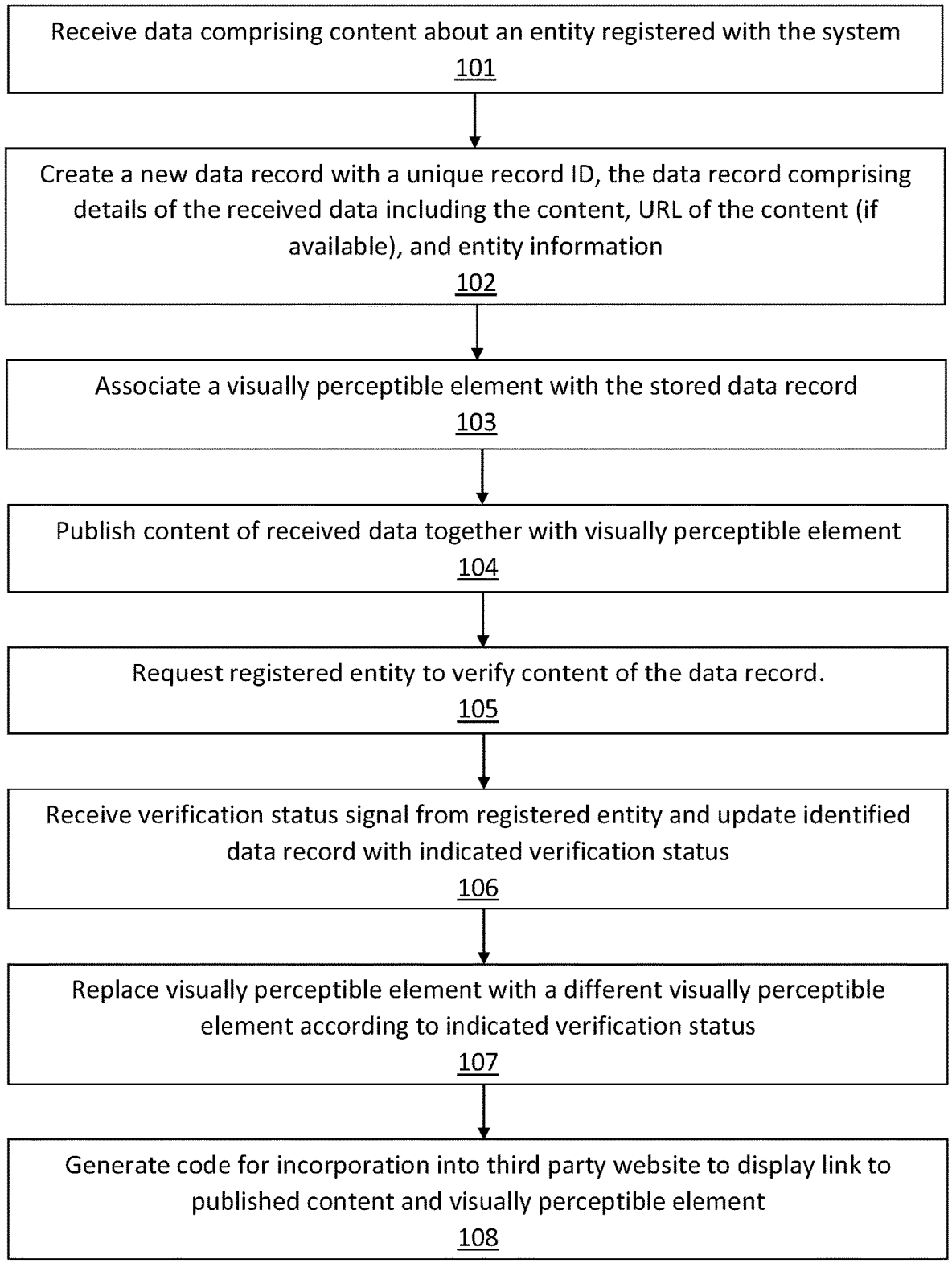
FIG. 5. shows a flowchart depicting the procedural steps for implementing a method according to the invention.

Data representing content related to an entity that is a registered user of the system 1 may be submitted by third parties to the server system 1 via a content submission Web page 61 for verification by the relevant registered user. Referring to FIG. 4 the content submission Web page 61 comprises one or more form fields for submission of different types of data. For example, data may be submitted as a string of text about a registered entity via a text input field 61a and may optionally be accompanied by a URL to a particular Web page on which the text is displayed submitted via a URL input field 61b. The data can also be a URL to an online video which is related to the registered user in question. The content submission Web page 61 is accessed from a particular registered user's public profile page 35 via a hyperlink which may be associated with a visual button 63 or text, as shown in FIG. 2. Upon clicking the hyperlink button 63, a unique code associated with the registered user is passed by the server system 1 from the profile Web page 35 to the content submission Web page 61 so that the data entered via the content submission Web page 61 can be associated with that registered user's account.

Data submitted by a third-party via the content submission Web page 61 is processed by the data processing module 17 which is configured to store the submitted data in the content database 11 as a new content record 69 with a unique record ID and to associate the content record 69 with the specified registered user. New content records 69 submitted via the content submission Web page 61 and added by the data processing module 17 to the content database 11 are automatically assigned a 'pending' status meaning that the data is awaiting verification by the registered user. Any stored content record 69 associated with a particular registered user is published on the public profile Web page 35 of that registered user as a snippet 65a, 65b, 65c, 65d for display to other users of the system 1 so that other users can review the verification status of different items of content 69. Details of each content record 69 associated with a registered user and subject to verification are also displayed as a list 67 on the back-end dashboard 51 of the registered user's registered account, as shown in FIG. 3.

The dashboard 51 allows a registered user to review each listed content record 69, follow the URL to view the content on a third party website or platform (if applicable) and to change the status from 'pending' to 'verified' if accepted by the registered user as authentic or from 'pending' to 'rejected' if the registered user considers the content to be inauthentic or is not happy to be associated with the online location of the content. If the registered user does nothing to a particular content record 69, it remains as pending. Optionally, the registered user may simply delete any content record 69 the registered user does not wish to verify in order to clean the list of such content records 69 so that only those content records 69 whose status are to be considered and changed are included. Upon changing the verification status of a particular content record 69, the data processing module 17 updates that content record 69 in the content database 11 and changes the verification status field accordingly.

The server system 1 stores three different verification status image or multimedia files 71, 73, 75 in memory 11, each of which represents a different content verification status. In each case, the image depicts the letters 'VID' (short for Virtual Identity) in a particular colour according to the verification status. In the present embodiment, a first image 71 comprises the letters VID depicted in grey for 'pending', a second image 73 comprises the letters VID depicted in green for 'verified' and a third image 75 comprises the letters VID depicted in red for 'rejected'. It will be appreciated that other visual indicators may be used as desired provided they can distinguish one verification status from another. For example, the server system 1 may be configured to allow a registered user to change the appearance of the verification status images associated with their account thereby allowing, for example, the user to specify a photograph, icon or logo in different colours according to different verification statuses.

The data processing module 17 is configured to update a content record 69 depending on its verification status and to associate the content record 69 with a verification status image 71, 73, 75 stored as a file in a file location with an image file name that is unique to the content record. The image file is stored at a file location that is accessible via a URL. For example, if the image file name is image1.jpg and is stored in a particular file location in the server system 1 memory 11 and is accessible across the Internet via a URL, the image file may be retrieved from the URL address which may follow the following format or similar:

http://www.serversystemwebsite.com/images/image1.jpg

When the verification status of a content record 69 is changed, the data processing module 17 overwrites the stored image file with the content of the appropriate verification status image file 71, 73, 75. For example, if a record is pending verification, the data processing module 17 saves the grey image 71 at the content record 69 image file location and assigns a unique name to the image file associated with that content record 69. If the verification status is changed by the user to 'verified', the data processing module 17 overwrites the stored image file e.g. image1.jpg with the verified status image file 73 at the specified file location. Accordingly, the image of, for example, image1.jpg retrieved from the image file location as specified by the image URL is changed from the grey VID image 71 to the green VID image 73.

Referring to FIG. 2, the image associated with the content record 69 is displayed on the public profile page 35 of the registered user in association with the relevant snippet 65a, 65b, 65c, 65d for that content record 69. Therefore, and advantageously, users can quickly determine the verification status of an item of content associated with an entity by simply viewing the verification image within the corresponding snippet 65a, 65b, 65c, 65d. Accordingly, the server system 1 provides a repository of content for a particular registered user that has been verified, rejected, or is awaiting verification by the registered user.

An alternative third-party content submission function is also provided by the server system 1. Referring once more to FIG. 2, a content submission button 77 is provided on the public profile page 35 of each registered user. Activation of the content submission button 77 triggers the data generation module 21 to generate a block of verification computer code for download to a requesting user device 25. The data processing module 17 is simultaneously triggered to create a new content record 69 in the content database 11 that is associated with the registered user from whose page the content submission button 75 was activated and includes the unique record ID to identify the new content record 69. The data processing module 17 is also configured to save the grey 'pending' verification status image 71 with a unique image file name in the image URL location associated with the new content record 69.

The downloaded block of verification computer code includes instructions to generate a content hyperlink with the URL of the public profile page 35 of the user and also to associate the hyperlink with the image URL that points to the image file for the newly created content record 69. In addition, the block of verification computer code includes the unique record ID for the newly created content record 69 so that, when the hyperlink is activated from a third party website, the unique record ID is passed to the data processing module 17 so that the appropriate content record 69 can be identified in the content database 11 for updating.

The downloaded block of verification computer code is intended to be incorporated into the computer code of a third-party website or software application and to display the verification status image 71, 73, or 75 associated with the created content record 69. Accordingly, in the case of a newly created content record 69 with a pending status, the grey VID image file 71 will be saved in an image file location accessible by URL for that content record 69 and will be retrieved for display on the third party website in proximity to the associated content at the location at which the block of verification computer code is incorporated into the third party website.

The content tracking module 19 is configured to implement one or more web crawlers or 'crawler bots' to follow hyperlinks on third party websites and locate content hyperlinks incorporated into such third party websites that are directed to public profile pages 35 of registered users of the server system 1. Since each content hyperlink includes the unique record ID for a particular content record 69, upon locating a content hyperlink, the content tracking module 19 may pass the record ID and the URL of the third party website on which the content hyperlink is located to the data processing module 17 so that the corresponding content record 69 can be identified and the URL location of the content hyperlink can be added to the content record 69.

When the URL location of a content hyperlink is determined and added to the relevant content record 69, the content record 69 is displayed on the verification dashboard 51 of the related registered user for verification purposes. Accordingly, the registered user can follow the URL location of the content record 69 to view the content marked by the block of verification computer code and decide whether to verify the content or reject the content. If the registered user updates the content record 69 to verified status, the data processing module 17 overwrites the unique image file for that content record 69 with the verified status image 73 i.e. the green VID image.

Likewise, if the registered user marks a content record 69 as rejected, the data processing module 17 overwrites the same unique image file for that content record 69 with the rejected status image 75 i.e. the red VID image. Since the block of verification computer code incorporated into the third-party website retrieves the unique image file associated with the content record 69 from the image URL, the saved image is displayed on the third party website. Accordingly, the verification status image displayed on the third-party website is automatically changed when the registered user changes the verification status of the associated content record 69 on their dashboard 51. In this way, public users of a third party website that includes the block of verification computer code may quickly determine the authenticity of the content in real-time and follow the link to the public profile Web page 35 to view the published record of the corresponding content record 69 and determine that the verified content is associated with the relevant entity.

In addition to third party content submission, registered users may directly publish content to their public profile page 35. A post including content such as text, an image or video may be created by the user and submitted via their account for processing by the data processing module 17. Content submitted by a registered user is added as a new content record 69 in the content database 11 and is automatically assigned a verified status (since it originates from the registered user). Accordingly, the new content record 69 is associated with the green 'verified' image URL so that the verified status image 73 is displayed in proximity to the published content record snippet 65a, 65b, 65c, 65d on the user's public profile page 35.

Each published content record snippet 65a, 65b, 65c, 65d appearing in the feed 45 of a registered user's public profile Web page 35 is associated with a generate link button 79. Upon activation of the generate link button 79, the data generation module 21 of the server system 1 generates a block of verification computer code including a hyperlink to the published content of the content record 69, the verification status of the content record 69, and the URL of the verification status image 71, 73, 75 associated with the content record 69. As above, the block of verification computer code may be incorporated into the code of a third party website for the creation of a hyperlink to the associated published content record 69 snippet 65a, 65b, 65c, 6d on the relevant user profile Web page 35 of the server system 1. The block of verification computer code also displays the verification status image 71, 73, 75 which is retrieved from the image URL associated with the content record 69. Accordingly, if the verification status for the content record 69 is changed, thereby changing the image associated with the content record 69, the image displayed on the third party website is correspondingly changed to reflect the verification status change. Advantageously, the visual verification is automatically changed on multiple third party websites incorporating the block of verification computer code without the need to generate a new block of verification computer code that reflects the change in verification status. By providing a hyperlink to the specific item of content published on the public profile Web page 35 of the registered user, viewers of the registered user specific content displayed on a third party website are able to follow the link to verify the official current verification status of the content.

It is envisaged that certain high-profile registered users of the system 1 may be overwhelmed with a high volume of content verification requests. Accordingly, to assist a registered user with the processing of content verification requests, the system 1 further comprises an artificial intelligence (AI) based content management module 81 which is operable to analyse each data submission based on various predetermined criteria and to automatically delete content records 69 that fail to meet certain qualifying criteria or, for content records 69 deemed to satisfy certain qualifying criteria, to suggest either a verify action or a rejection action.

The qualifying criteria may include a requirement that the created content record 69 originates from an IP address that has not been blacklisted, from another verified registered user of the system 1, from a requesting registered user that is included on a list of registered users approved by the authenticating registered user for submission purposes, from a registered user or IP address with a positive submission history e.g. more than 70% of previous submission requests have been verified as authentic, or from other trusted sources such as the IP address of a reputable media outlet e.g. BBC. Accordingly, for content submission filtering purposes, the content management module 81 is operable to maintain a list of IP addresses that are determined to have low repute, be associated with dangerous/offensive content, or associated with spammy activity, and to maintain a list of IP addresses that have a good track record of content submissions or that are associated with reputable websites or platforms e.g. Twitter, LinkedIn, Facebook and mainstream media websites. The content management module 81 is also configured to allow registered users to build a list of approved users for submission purposes and also to maintain a record of all content submission requests by registered users so that a trustworthiness or reputation score may be associated with each registered user for filtering purposes.

For automated verification suggestions in respect of each newly created content record 69, the content management module 81 is configured to determine a verification score based on the submission history of the registered user or IP address from which a content submission originates, an analysis of previously processed content records 69 concerning the same or similar content, and a cross check of the content against other reputable sources of information such as Wikipedia and the verified accounts of the same registered user's other social media platforms such as their Twitter feed. For example, if a content record 69 is created based on a submission request relating to the year of birth of a registered user and the content submission is determined by the content management module 81 to satisfy the criteria for verification review, the content management module 81 proceeds to analyse the source of the content submission including the submission record of the source and any associated reputation score, and also conducts a cross check against previously processed content submissions and third party websites for similar content. If the content submission is determined to have originated from a reputable source with a high reputation score and the same content is found in other published resources and/or a previous submission that has been approved by the registered user, the content management module 81 may suggest a 'verify' action and optionally include confidence score e.g. 87/100.

Conversely, if the content management module 81 determines that the source is not reputable or has a lower reputation score and/or that the content in question does not correspond to other published resources concerning the same content or subject and/or has already been rejected by the registered user in respect of an earlier content submission, the content management module 81 may suggest a 'reject' action and a corresponding confidence score. In this respect, the confidence score represents the degree to which the content management module 81 determines its suggestion to be correct such that a high confidence score e.g. 80/100 is an indication that the suggested action is correct and a low confidence score i.e. below 50/100 is an indication that the suggested action may not be correct and requires further scrutiny. Accordingly, the content management module 81 allows a registered user to more efficiently and quickly manage the verification of content submissions submitted to their account.

In use, the server system 1 can be implemented to verify the authenticity of content related to an entity registered with the system 1. In a first step 101, a journalist, for example, may write a quote about an entity and submit the quote to the relevant registered user for verification via the content submission Web page 61 accessed from the registered user's public profile page 35. In a second step 102, the data representing the text is added to the content database 11 as a new content record 69 and is automatically assigned a pending status and associated with the user. Accordingly, in a third step 103, the grey VID verification status image 71 is saved as the image file associated with the new content record 69 and, in a fourth step 104, is displayed adjacent to the quote when published on the registered user's public profile feed 45. The registered user's list of verification items 67 is populated with the new content record 69 for review and verification by the registered user.

In a fifth step 105, the registered user selects a verification status for the content record 69 which is transmitted to the server system 1 for processing. Depending on the registered user's verification action, in a sixth step 106, the status of the content record 69 may be updated with a verified or rejected status and, in a seventh step 107, the image is changed accordingly for display in the registered user's feed to communicate to other users the authenticity of the content. In an eighth step 108, the journalist activates the generate link button 79 associated with the relevant published content 65*a*, 65*b*, 65*c*, or 65*d* to generate a block of verification computer code for incorporation into a third party website. Upon incorporation into the third party website, if the verification status of the content record is 'verified', the green VID verification status image 75 is retrieved by the block of verification computer code from the server system 1 and displayed on the website, again as a visual indicator for viewers of the third party website as to the authenticity of the content. If the registered user decides to change the verification status e.g. from verified to rejected, the content record 69 is updated and the image associated with that content record is overwritten with the rejected verification status image 75 such that the green VID image is replaced by the red VID image which is then automatically displayed by the block of verification computer code on the third party website.

In a further example, an editor of a third party website may be publishing content about an entity that is a registered user of the server system 1 and may wish to clearly communicate the authenticity of the content to viewers of the third party website. For example, if the content includes the age of the registered user, the editor may visit the public profile Web page 35 of the registered user to check the feed 45 to see if any published snippets 65*a*, 65*b*, 65*c*, 65*d* include a verified age as indicated by the green VID image. If the editor finds a relevant snippet 65*a*, 65*b*, 65*c*, 65*d* with a verified age, the editor may activate the generate link button 79 associated with that snippet to generate a block of verification computer code for incorporation into the third party website so that the verified image is shown in proximity to the content relating to the registered user's age. In this way, the VID image of the server system 1 represents a badge of authenticity for viewers.

Alternatively, the journalist may first publish the quote on a third-party website and download a block of verification computer code from the relevant user's public profile page 35 via the content submission button 75. If the block of verification computer code is incorporated into the third party website in proximity to the content to be verified, a crawler bot of the content tracking module 19 will eventually follow the hyperlink associated with the block of verification computer code and pass both the URL and unique record ID for that content record 69 to the data processing module 17 of the server system 1 so that the relevant content record 69 may be updated with the content URL location. The registered user may then follow the URL shown in its dashboard 51 for that particular data record to review the content and take a verification action via the user dashboard 51 to change the verification status as appropriate. As above, if a change verification status action is taken by the registered user, the image file associated with the content record is overwritten by the data processing module with the appropriate verification status image 71, 73, 75 according to the selected verification status so that the appropriate VID image is displayed by the block of verification computer code on the third party website.

The above embodiment is described by way of example only. Many variations are possible without departing from the scope of the invention as defined in the appended claims.

For example, the server system 1 may further comprise an API module (not shown) comprising a set of instructions stored in memory 5 that are configured to allow authorised third-party software applications to interface with the server system to retrieve and add content records 69. Accordingly, a third party software application that is registered with the server system 1 for API access may submit a suitable request, such as a GET request, to an endpoint of the API module to obtain the data of one or more content records 69 associated with a particular registered user of the server system 1 for display on the third party software application or website.

A request may include the unique code of a registered user to obtain a list of all content records 69 associated with that registered user or the unique record ID of a specific content record 69. The API module may be configured to return a set of data in response to the request, including the verification status of the or each requested content record 69, the URL of the displayed content record 69, and the URL of the verification image file associated with the or each content record 69. The third party software application may process the data of the response package to display the verification image and provide a hyperlink to the display location of the content record 69. Alternatively, the third party software application may use the data of the response package to construct a bespoke block of computer code for incorporation into the third party software application. The bespoke block of computer code may comprise a hyperlink to the URL location of a particular content record 69 and, instead of or in addition to the verification image, may include some anchor text e.g. 'authentic' for display in a specified colour to indicate the verification status of the content record 69.

The third party software application may routinely request data of a content record 69 in real-time via the API and update content displayed by the third party software according to the latest received data. Therefore, when a registered user updates the verification status of a content record 69, the data processing module 17 may be configured to change the verification status and verification status image file 71, 73, 75 that is associated with the content record 69. This is different from the above-described embodiment which overwrites a stored image file associated with a content record 69 with the appropriate verification status image 71, 73, 75. Advantageously, associating a content record 69 with one of three stored verification status image files 71, 73, 75 instead of creating a unique image file for each content record 69 that may be overwritten according to verification status reduces the image storage requirements.

The third party software application may also submit requests to create new content records 69 via the API module. For example, a third party software application may submit a PUT request to an endpoint of the API module with data corresponding to an item of content that may be verified by a registered user of the server system 1. The data may include some text or content about the registered user or alleged to have originated from the registered user. The request may include the unique code of a registered user to allow the server system 1 to associate the data with the correct registered user. The request may also include the URL of the Web page on which the content has been published. The data processing module 17 may be configured to process the data received via the API module and create a new content record 69 with a pending verification status and corresponding pending verification image file 71 for display in the relevant registered user's dashboard 51 for verification. The API module may return a response package to the third party software application with a unique record ID of the new content record 69 so that the third party software application can request the data of the content record with a suitable GET request.

When the account of the registered user updates the verification status of the content record 69, the image file 71, 73, 75 associated with the content record 69 is changed as appropriate. Therefore, if a third party software application submits a suitable request to the API module with the unique record ID, the API module may return the data of the requested content record 69. The third party software application may process the data as described above and communicate the current verification status to users of the third party software or website together with the corresponding content.

The invention claimed is:

1. A computer-implemented method of verifying the authenticity of separate items of content associated with an entity and communicating the verification status of each separate item of content across a network for visual display to a user comprising:

using a computer processor to perform a plurality of steps, wherein the steps perform:

registering and authenticating the entity by performing multi-factor authentication of the entity based on verification of a one-time password transmitted to a telephone number or email address registered to the entity;

upon successfully authenticating the entity, receiving multiple separate data submissions from third parties, wherein each data submission comprises a different item of content that is alleged to relate to the entity;

creating a separate data record for each of the received separate data submissions and storing details of each separate data record in memory;

generating a unique identifier for each data record created;

for each stored data record, associating a visually perceptible element with the stored data record, wherein the visually perceptible element is a digital image stored in memory as a file with a unique filename and the visually perceptible element, when displayed on the display of a computing device of a user, corresponds to a first verification status of the associated data record, wherein the first verification status is generated based on a reputation of the third-party source of the data submission;

publishing received data of each data record on a content verification web page managed by or on behalf of the entity, together with the associated visually perceptible element of each corresponding data record, wherein the content verification web page is publicly available to other registered users for review;

for each data record, requesting the entity to which the received data submission relates to verify or reject the authenticity of the alleged item of content;

for each data record, receiving a verification status signal from a computing device indicating a verification status of the received item of content as verified or rejected, wherein the verification status signal is generated and transmitted following the entry of credentials known only to the entity or a representative of the entity;

for each data record, upon receipt of the verification status signal sent by, or on behalf of, the entity, updating the data record with the indicated verification status;

for each data record, upon updating the data record with the indicated verification status, causing a different digital image of a different visually perceptible element to be displayed as the visually perceptible element of the updated data record, wherein the different visually perceptible element corresponds to the indicated verification status;

for any one of the data records, upon request by a third-party, generating a response related to the data record for the display of data related to the data record on a third-party web page, the generated response including data for the display on the third-party web page comprising an active link, the verification status of the data record and the visually perceptible element associated with the data record, wherein the active link includes the unique identifier and links to the content verification web page and the data record; and crawling web pages to detect an unrecorded additional third-party web page on which an additional active link is located and storing details of the additional third-party web page in the data record corresponding to the unique identifier, wherein the additional active link is to a verification web page controlled by the entity and the additional active link includes the unique identifier, wherein the stored details include a uniform resource locator (URL) of the third-party web page on which the additional active link is located which the entity uses to visit the URL and verify content displayed at the URL.

2. The computer-implemented method of claim 1, wherein, for each data record, the step of associating the data record with causing the different digital image of the different visually perceptible element to be displayed as the visually perceptible element comprises overwriting the file of the visually perceptible element with the different digital image of the different visually perceptible element or associating the data record with a different file storing the digital image of the different visually perceptible element.

3. The computer-implemented method of claim 1, wherein the additional active link includes details that are unique to a stored data record so that, upon locating an additional active link, the stored data record associated with the additional active link can be identified.

4. The computer-implemented method of claim 1, wherein each visually perceptible element is different from each other visually perceptible element and comprises one or more letters and/or one or more words and/or one or more images, each visually perceptible element representing a verification status of the associated data record.

5. The computer-implemented method of claim 1, wherein each visually perceptible element is displayed in a particular colour or combination of colours to indicate the verification status, wherein each visually perceptible element comprises a different colour or combination of colours from each other visually perceptible element.

6. The computer-implemented method of claim 1, further comprising the step of filtering received data according to predetermined criteria, said predetermined criteria including one or more of: the IP address from which the data is received, the submission history of a registered user of the system from which the data is received, the URL on which the received data is located, and a reputation score assigned to a registered user of the system from which the data is received.

7. The computer-implemented method of claim 1, further comprising the steps of, for each received data submission, analysing the content of the received data and cross-checking the content against one or more other trusted data sources and/or previously assessed data records to assess the authenticity of the data, and automatically suggesting a verification status for the received data based on the assessment.

8. The computer-implemented method of claim 1, further comprising the step of verifying the identity of the entity to which the received data is associated based on confirmation from the entity or a representative of the entity of access to a registered account of the entity with a third party service that has already verified the identity of the entity.

9. A system for verifying the authenticity of separate items of information associated with an entity and communicating the verification status of each separate item of information across a network for visual display to a user comprising:

a registration and authentication module for registering and authenticating the entity by performing multi-factor authentication of the entity based on verification of a one-time password transmitted to a telephone number or email address registered to the entity;

a data receiving module, wherein upon successfully authenticating the entity the data receiving module is operative for receiving multiple separate data submissions from third parties, wherein each data submission comprises a different item of content that is alleged to relate to the entity;

a data processing module for creating a separate data record for each of the received separate data submissions and storing details of each separate data record in memory;

the data processing module configured to generate a unique identifier for each data record created;

the data processing module configured, for each stored data record, to associate a visually perceptible element with the corresponding stored data record, wherein the visually perceptible element is a digital image is stored in memory as a file with a unique filename and the visually perceptible element, when displayed on the display of a computing device, corresponds to a first verification status of the associated data record, wherein the first verification status is generated based on a reputation of the third-party source of the data submission;

the data processing module further configured to publish received data of each data record on a content verification web page managed by or on behalf of the entity, together with the associated visually perceptible element of each corresponding data record, wherein the content verification web page is publicly available to other registered users for review;

the data processing module further configured, for each data record, to request the entity to which the received data submission relates to verify or reject the authenticity of the alleged item of content;

the data processing module further configured, for each data record, to receive a verification status signal from a computing device indicating a verification status of the received item of content as verified or rejected, wherein the verification status signal is generated and transmitted following the entry of credentials known only to the entity or a representative of the entity;

the data processing module further configured, upon receipt of the verification status signal sent by, or on behalf of, the entity, to update the data record with the indicated verification status;

the data processing module further configured, for each data record, upon updating the data record with the indicated verification status, causing a different digital image of a different visually perceptible element to be displayed as the visually perceptible element of the updated data record, wherein the different visually perceptible element corresponds to the indicated verification status; and a data generation module configured, for any one of the data records, upon request by a third party, to generate a response related to the data record for the display of data related to the data record on a third-party web page, the generated response including data for the display on the third-party web page comprising an active link the verification status of the data record and the visually perceptible element associated with the data record, wherein the active link includes the unique identifier and links to the content verification web page and the data record; and a web crawler module configured for crawling web pages to detect an unrecorded additional third-party web page on which an additional active link is located and storing details of the additional third-party web page in the data record corresponding to the unique identifier, wherein the additional active link is to a verification web page controlled by the entity and the additional active link includes the unique identifier, wherein the stored details include a uniform resource locator (URL) of the third-party web page on which the additional active link is located which the entity uses to visit the URL and verify content displayed at the URL.

10. The system as claimed in claim 9, wherein for each data record, the data processing module is configured to a cause the different digital image of the different visually perceptible element to be displayed as the visually perceptible element by overwriting the file of the visually perceptible element with the different digital image of the different visually perceptible element or associating the data record with a different file storing the digital image of the different visually perceptible element.

11. The system of claim 10, wherein the additional active link includes details that are unique to a stored data record so that, upon locating an additional active link, the stored data record associated with the additional active link can be identified.

12. The system of claim 9, wherein each visually perceptible element is different from each other visually perceptible element and comprises one or more letters and/or one or more words and/or one or more images, each visually perceptible element representing a verification status of the associated data record.

13. The system of claim 9, wherein each visually perceptible element is displayed in a particular colour or combination of colours to indicate the verification status of the associated data record, wherein each visually perceptible element comprises a different colour or combination of colours from each other visually perceptible element.

14. The system of claim 9, further comprising a content management module configured to filter received data according to predetermined criteria, said predetermined criteria including one or more of: the IP address from which the data is received, the submission history of a user of the system from which the data is received, the URL on which the data received is located, and a reputation score assigned to a user of the system from which the submitted data is received.

15. The system of claim 14, wherein the content management module is further configured, for each received data submission, to analyse the content of the received data and cross-check the content against one or more other trusted data sources and/or previously assessed data records to assess the authenticity of the data, and automatically suggesting a verification status for the received data based on the assessment.

16. The system of claim 9, configured to verify the identity of the entity to which the received data is associated based on confirmation from the entity or a representative of the entity of access to a registered account of the entity with a third party service that has already verified the identity of the entity.

* * * * *